US 6,981,271 B2

(12) United States Patent
Minase et al.

(10) Patent No.: US 6,981,271 B2
(45) Date of Patent: Dec. 27, 2005

(54) DISK DEVICE

(75) Inventors: Minoru Minase, Iruma (JP); Shigeru Fukinuki, Kokubunji (JP); Yo Kamei, Kokubunji (JP); Noriyuki Kato, Tokyo (JP)

(73) Assignee: Teac Corporation, Tokyo (JP)

( * ) Notice: Subject to any disclaimer, the term of this patent is extended or adjusted under 35 U.S.C. 154(b) by 220 days.

(21) Appl. No.: 10/701,371

(22) Filed: Nov. 3, 2003

(65) Prior Publication Data

US 2004/0133904 A1    Jul. 8, 2004

(30) Foreign Application Priority Data

Nov. 27, 2002   (JP) .............................. 2002-343388

(51) Int. Cl.[7] .......................... G11B 33/12; G11B 17/03
(52) U.S. Cl. ..................................... 720/652; 720/601
(58) Field of Search ............................... 720/652, 601; 369/75.11, 75.21, 77.11, 77.21

(56) References Cited

U.S. PATENT DOCUMENTS 6,151,284 A * 11/2000 Watanabe et al. ........... 720/601
2003/0193787 A1 * 10/2003 Manabe et al. .............. 361/752
2004/0093609 A1 *  5/2004 Choi ........................... 720/601
2004/0111732 A1 *  6/2004 Park et al. ................... 720/650
2004/0111733 A1 *  6/2004 Bae ............................. 720/652
2004/0205785 A1 * 10/2004 Takahashi et al. .......... 720/601
2004/0250268 A1 * 12/2004 Togawa ....................... 720/601
2004/0261088 A1 * 12/2004 Hsu et al. ................... 720/601

FOREIGN PATENT DOCUMENTS

JP        2001-229659        8/2001

* cited by examiner

Primary Examiner—Allen Cao
(74) Attorney, Agent, or Firm—J.C. Patents

(57) ABSTRACT

A disk device for improving a S/N ratio is provided with a spindle motor control substrate 10 arranged below a tray 3 via a buffer material and a medium substrate 12 arranged at a position different from the spindle motor control substrate 10 below the tray 3. The spindle motor control substrate 10, the medium substrate 12 and the main control substrate 7 of the device body are connected each other with a flexible print circuit (FPC) 9. The medium substrate 12 and a pickup head 1c are connected with other FPC. The head detection signal is provided to the main control substrate 7 through the medium substrate 12. A driver IC for motor drive system is carried on the spindle motor control substrate 10. The motor drive signal is apart from the head detection signal and is provided to a spindle motor 1a or a head transferring motor.

3 Claims, 6 Drawing Sheets

DISK DEVICE

CROSS-REFERENCE TO RELATED APPLICATION

This application claims the priority benefit of Japanese application serial no. 2002-343388, filed on Nov. 27, 2002.

BACKGROUND OF THE INVENTION

1. Field of the Invention

The present invention relates to a disk device. In particular, the present invention relates to a slim type disk device for computer.

2. Description of the Related Art

At present, slim type CD-ROM drives, CD-R/RW drives and DVD drives, have been developed for applying in notebooks.

FIGS. 5 and 6 show a structure of a conventional disk device (Japan Laid-Open Publication No. 2001-229659), wherein FIG. 5 is a disassembly perspective view, and FIG. 6 is a perspective view showing a status that the tray is pull out of the device body.

The disk device comprises a spindle motor 1a that drives to rotate the disk 8 to a predetermined number of cycles, and a pickup (reproduction) head 1c that reproduces information recorded on the disk 8. The spindle motor 1a and the pickup head 1c are made as an integral unit 1 installed on a tray 3. A front cover 6 is arranged in front of the tray 3. A taking-out switch is arranged on the front cover 6. In order to restrain the vibration due to a disk mass eccentricity, the unit 1 is installed below the tray 3 through a buffer material (damper).

A bottom case 4, a top case 5 and a guide mechanism 3a movably supporting the tray 3, are arranged in the device body. A control substrate (main control substrate) 7 is arranged in the bottom case 4. The unit 1 and the main control substrate are connected to each other with a flexible print circuit (FPC) 9. The FPC 9 branches into two directions at the side of the unit 1 as shown in FIG. 6 and is connected to the unit 1 at a position that is a point-symmetry position with respect to the center of mass of the unit 1.

In order to improve the signal-to-noise ratio (S/N) in a case when the main control substrate 7 and the unit 1 are electrically connected by the FPC 9, some have proposed to divide an electricity signal into a current drive signal and a voltage drive signal and then provide these signals to the unit 1 through the main control substrate 7.

Even though the FPC 9 branches into two directions at the side of the unit 1, the two branches are still close to each other such that the drive current signal affects the detection signals coming form the pickup head. Furthermore, because the main control substrate 7 and the unit 1 are connected with each other by the FPC 9, the reaction force of the FPC 9 will press the unit 1 towards the tray 3 and the buffering effect of the buffer material supporting the unit 1 is counterbalanced.

SUMMARY OF THE INVENTION

The present invention provides a disk device for eliminating the undesirable effects due to the reaction force of the flexible substrate and for restraining the decreasing of the S/N ratio.

The present provides a disk device comprising: a body, having a main control substrate; a tray, arranged in a manner that can be moved in or apart from the body; a spindle motor control substrate, installed below the tray via a buffer material; a medium substrate, installed at a position different from the spindle motor control substrate below the tray; a first flexible substrate, connected between the main control substrate and the spindle motor control substrate, and between the main control substrate and the medium substrate; a second flexible substrate, connected between the spindle motor control substrate and a head transferring motor arranged below the tray; and a third flexible substrate, connected between the medium substrate and a head arranged below the tray. A driver that drives the spindle motor and the pickup head transferring motor is arranged on the spindle motor control substrate. The main control substrate and the pickup head transferring motor are connected with each other through the first flexible substrate, the spindle motor control substrate and the second flexible substrate. The main control substrate and the pickup head are connected with each other through the first flexible substrate, the medium substrate and the third flexible substrate.

The driver that drives the motor systems, such as a spindle motor, is carried on the spindle motor control substrate. Because the detection signal coming from the pickup head communicates with the medium substrate arranged at a position different from the spindle motor control substrate, the mixing of the noise towards the pickup head detection signal can be restrained.

According to an embodiment of the present invention, the device further comprises a fourth flexible substrate, connecting the spindle motor control substrate and the medium substrate. The driver drives the pickup head, and a drive signal of the pickup head that comes from the driver is supplied through the fourth flexible substrate and the medium substrate.

According to another embodiment of the present invention, the driver drives the pickup head, and a drive signal of the pickup head that comes from the driver is supplied through the third flexible substrate.

BRIEF DESCRIPTION OF THE DRAWINGS

While the specification concludes with claims particularly pointing out and distinctly claiming the subject matter which is regarded as the invention, the objects and features of the invention and further objects, features and advantages thereof will be better understood from the following description taken in connection with the following accompanying drawings.

DESCRIPTION OF THE PREFERRED EMBODIMENT

Hereinafter, preferred embodiments of the present invention will be described with reference to the accompanying drawings.

Figure 1:
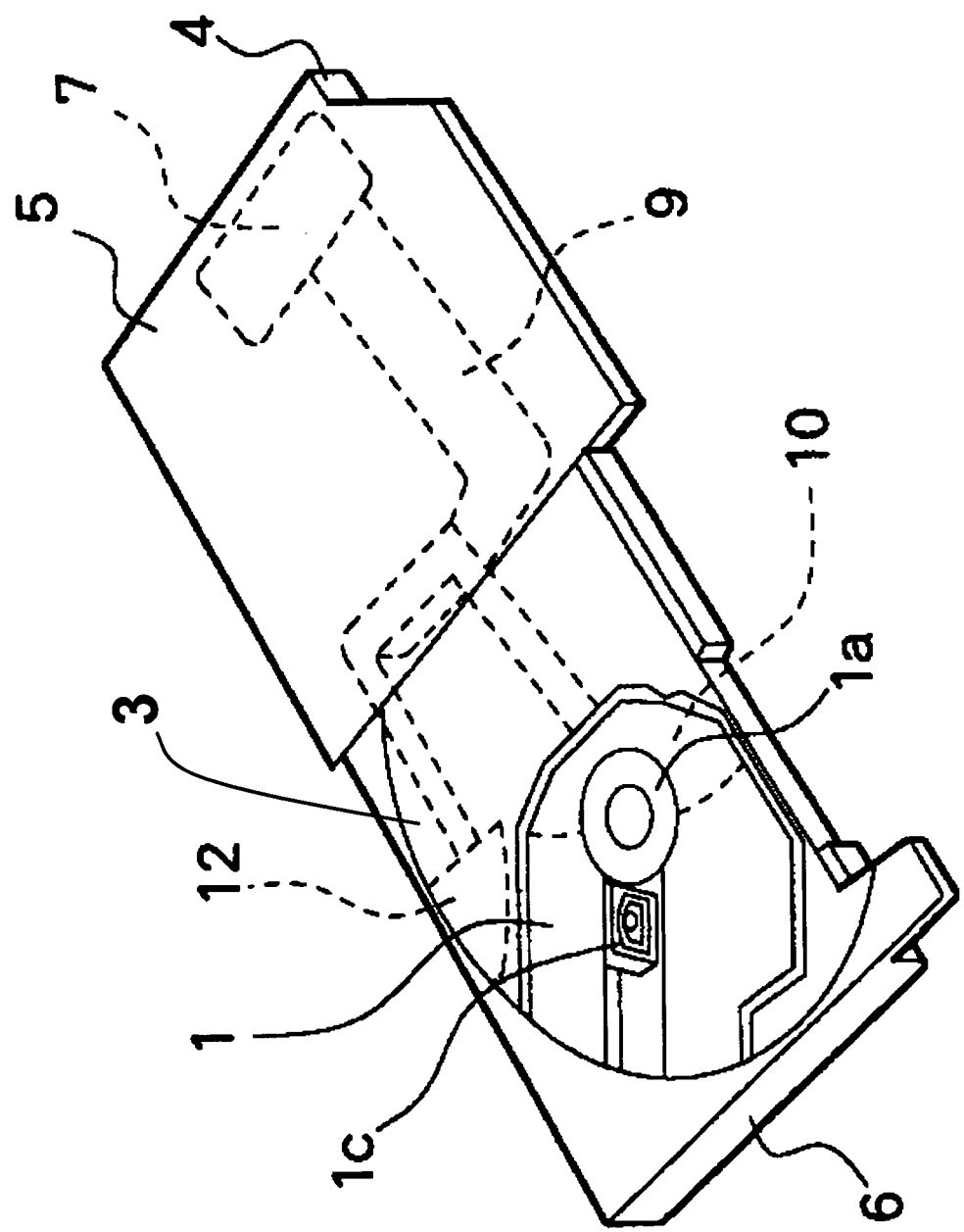
FIG. 1 is a perspective view showing a status that the disk device is pulled out of the device body.

FIG. 1 is a perspective view showing a status that the tray 3 of the disk device is pulled out of the device body.

Similar to the conventional disk device, the disk device in the present embodiment comprises a spindle motor 1a that drives to rotate a disk 8 to a predetermined number of cycles and a pickup (reproduction) head 1c that reproduces information recorded on the disk 8. The spindle motor 1a and the pickup head 1c are made as an integral unit 1 installed below a tray 3 via a buffer material. A front cover 6 is arranged in the front of the tray 3. A taking-out switch is arranged on the front cover 6. A bottom case 4 and a top case 5 are equipped with the device body, and a main control substrate 7 is arranged in the bottom case.

A spindle motor control substrate 10 that carries a spindle motor, a head transferring motor and a driver IC for driving the pickup head 1c is arranged in the unit 1 that is installed below the tray 3 via a buffer material. The spindle motor control substrate 10 and the main control substrate 7 of the device body is connected with each other with a U-shaped FPC 9.

A medium substrate 12 is arranged at a position apart from the spindle motor control substrate 10 below the tray 3. In a case when the medium substrate 12 is directly fixed onto the tray 3 without any buffer material, the medium substrate 12 and the main control substrate 7 of the device body can also be connected with each other with a U-shaped FPC 9.

In other words, the FPC 9 branches into two directions at the side of the tray 3, wherein one branch is connected to the connector of the spindle motor control substrate 10, and the other branch is connected to the connector of the medium substrate 12.

Figure 2:
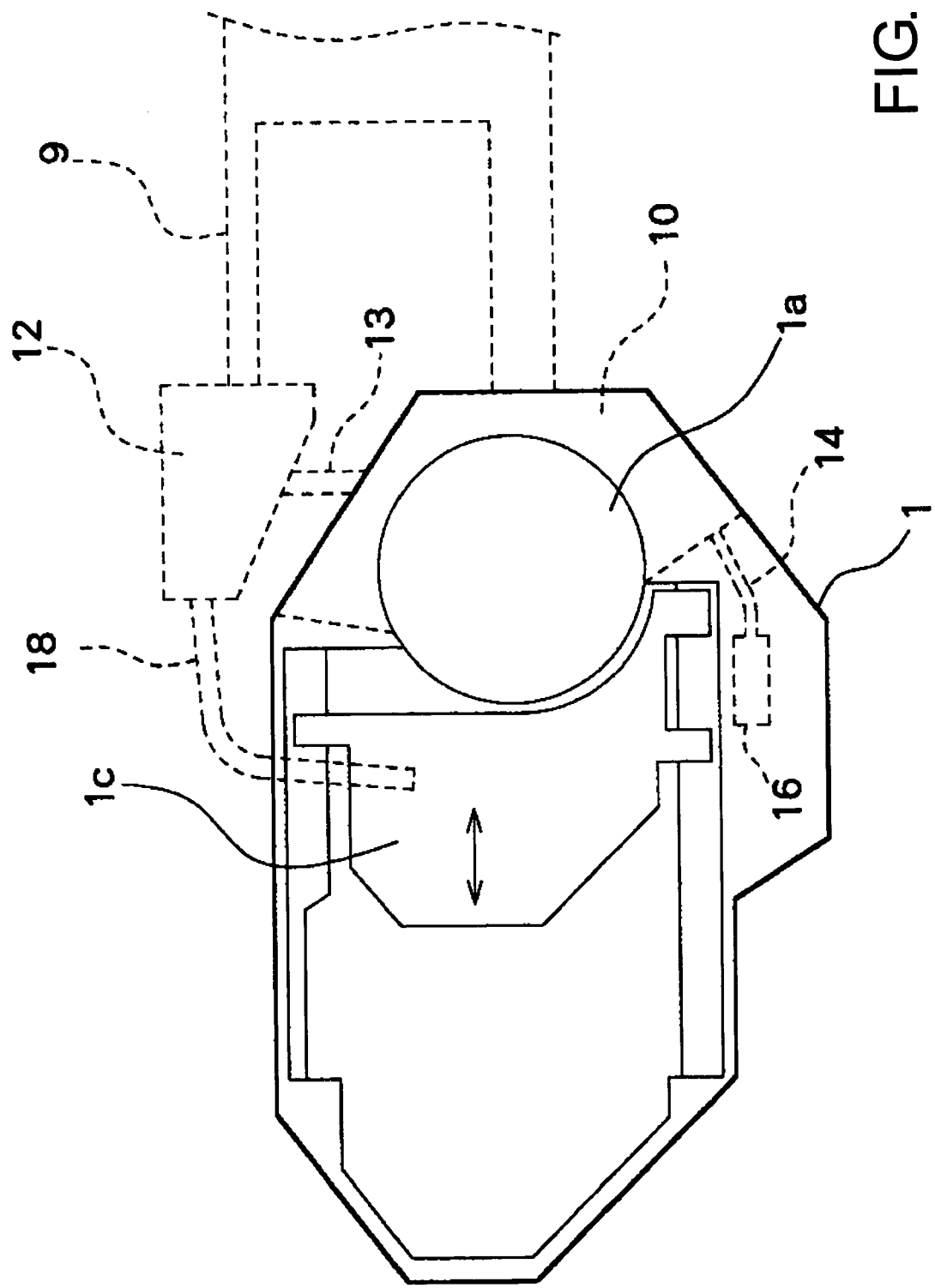
FIG. 2 shows the surrounding structure of the unit of FIG. 1.

FIG. 2 shows the surrounding structure of the unit 1 of FIG. 1. The spindle motor 1a and the pickup head 1c are arranged in the unit 1. The pickup head 1c is driven in the directions indicated by the arrows (seek operation) by a head transferring motor 16 and a transferring mechanism (not shown). The spindle motor control substrate 10 is arranged close to the spindle motor 1a below the unit 1. The spindle motor control substrate 10 and the transferring motor 16 are connected with each other with a FPC 14.

The medium substrate 12 is arranged at a place different from the position of the spindle motor control substrate 10 (such as at one corner of the tray 3) below the tray 3. The medium substrate 12 carries no driver IC and functions as a signal relay plate. The medium substrate 12 and the spindle motor control substrate 10 are connected with each other with a FPC 13. The medium substrate 12 and the head 1c are connected with a FPC 18. The FPC 18 that connects the medium substrate 12 and the pickup head 1c has an adequate length to allow the seek operation of the pickup head 1c.

The driver IC carried on the spindle motor control substrate 10 drives the spindle motor 1a, the head transferring motor 16 and the pickup head (specifically speaking, the actuator) 1c. The driver IC provides drive signals to the spindle motor 1a, the head transferring motor 16 and the pickup head (actuator) 1c according to the commands coming from the main control substrate 7. The commands coming from the main control substrate 7 are provided to the driver IC through the FPC 9. The drive signal that comes from the driver IC towards the spindle motor 1a is provided in the spindle motor control substrate 10. The drive signal that comes from the driver IC towards the head transferring motor 16 is supplied through the FPC 14. The drive signal that comes from the driver IC towards the pickup head (actuator) 1c is supplied through the FPC 13, the medium substrate 12 and the FPC 18.

In the present embodiment, the control substrate at the side of the tray 3 is divided into the spindle motor control substrate 10 and the medium substrate 12. The spindle motor control substrate 10 is resiliently supported on the tray 3, and the medium substrate 12 is fixed onto the tray 3. Because the control substrate is divided into the spindle motor control substrate 10 and the medium substrate 12 and then connected to the FPC 9, the connection portion of the FPC 9 and the spindle motor control substrate 10 can be made small. Thus, the force (reaction force) of the FPC 9 pressing the spindle motor control substrate 10 towards the tray 3 can be released. The function of vibration-resistance of the unit 1 can be maintained.

Moreover the driver IC that drives the motor or head is carried on the spindle motor control substrate 10 rather than the medium substrate 12 that relays the head detection signal. Furthermore, because the spindle motor control substrate 10 and the medium substrate 12 are apart from each other, the noise that comes form the driver IC and effects the head detection signal can be restrained such that the decreasing of the S/N ratio can be restrained.

Figure 3:
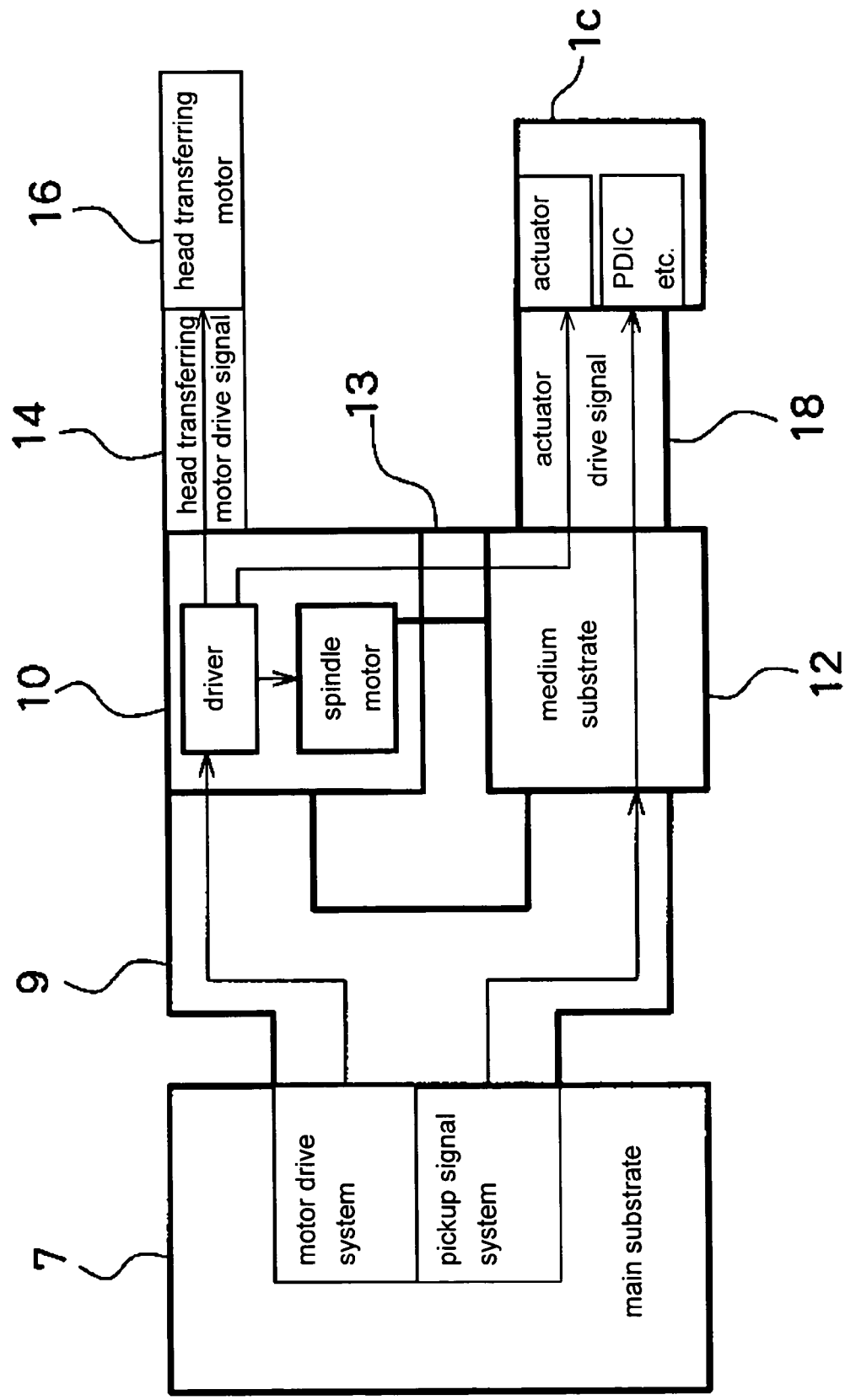
FIG. 3 is a block diagram showing an embodiment according to the present invention.

FIG. 3 is a block diagram showing an embodiment according to the present invention. The main control substrate 7 includes a motor drive circuit and a pickup (head) signal circuit. The branches of the FPC 9 connect the connector of the main control substrate 7, the connector of the spindle motor control substrate 10 and the connector of the medium substrate 12. The commands coming from the motor drive circuit in the main control substrate 7 is provided to the driver IC of the spindle motor control substrate 10 through one of the branches of the FPC 9. The head signal circuit in the main control substrate 7 is connected to the pickup head 1c through the other branch of the FPC 9, the medium substrate 12 and the FPC 18. An actuator and a photo-detector IC (PDIC) are arranged in the pickup head 1c. The actuator drive signal is supplied through the FPC 18. The head detection signal is provided to the main control substrate 7 through the FPC 18 and the medium substrate 12. The bus combination of the signals of the motor drive system and the head detection system will be described as followings.

<Motor Drive System>

Main control substrate 7-FPC 9-spindle motor control substrate 10-FPC 14; or main control substrate 7-FPC 9-spindle motor control substrate 10-FPC 13-medium substrate 12-FPC 18;

<Head Detection System>

Main control substrate 7-FPC 9-medium substrate 12-FPC 18-pickup head 1c. In the present embodiment, the actuator drive signal that comes from the driver IC is provided to the head 1c through the FPC 13, the medium substrate 12 and the FPC 18. However, it is also possible that the actuator drive signal is provided to the head 1c through only the FPC 18 rather than the FPC 13 and the medium substrate 12.

Figure 4:
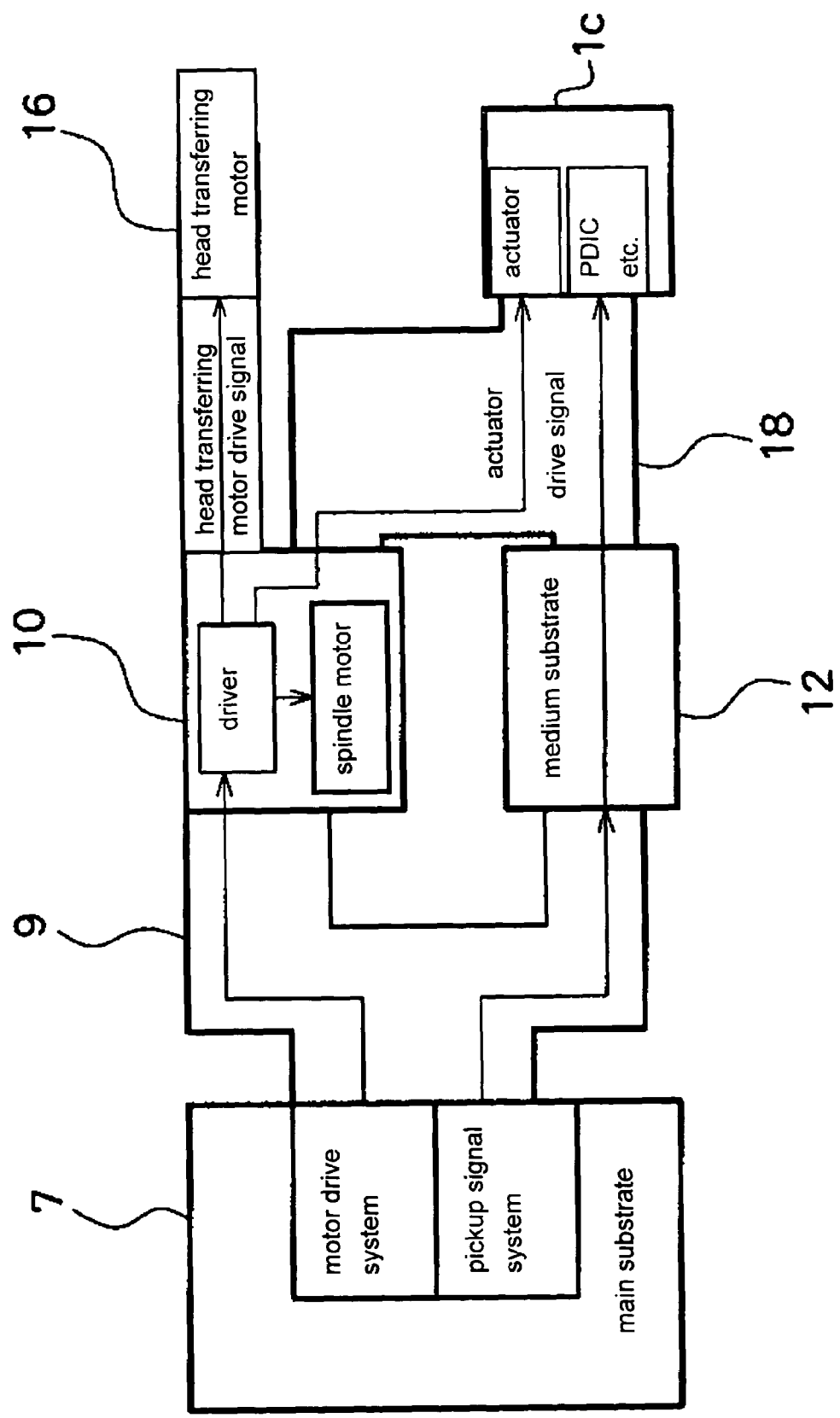
FIG. 4 is a block diagram showing another embodiment according to the present invention.
Figure 5:
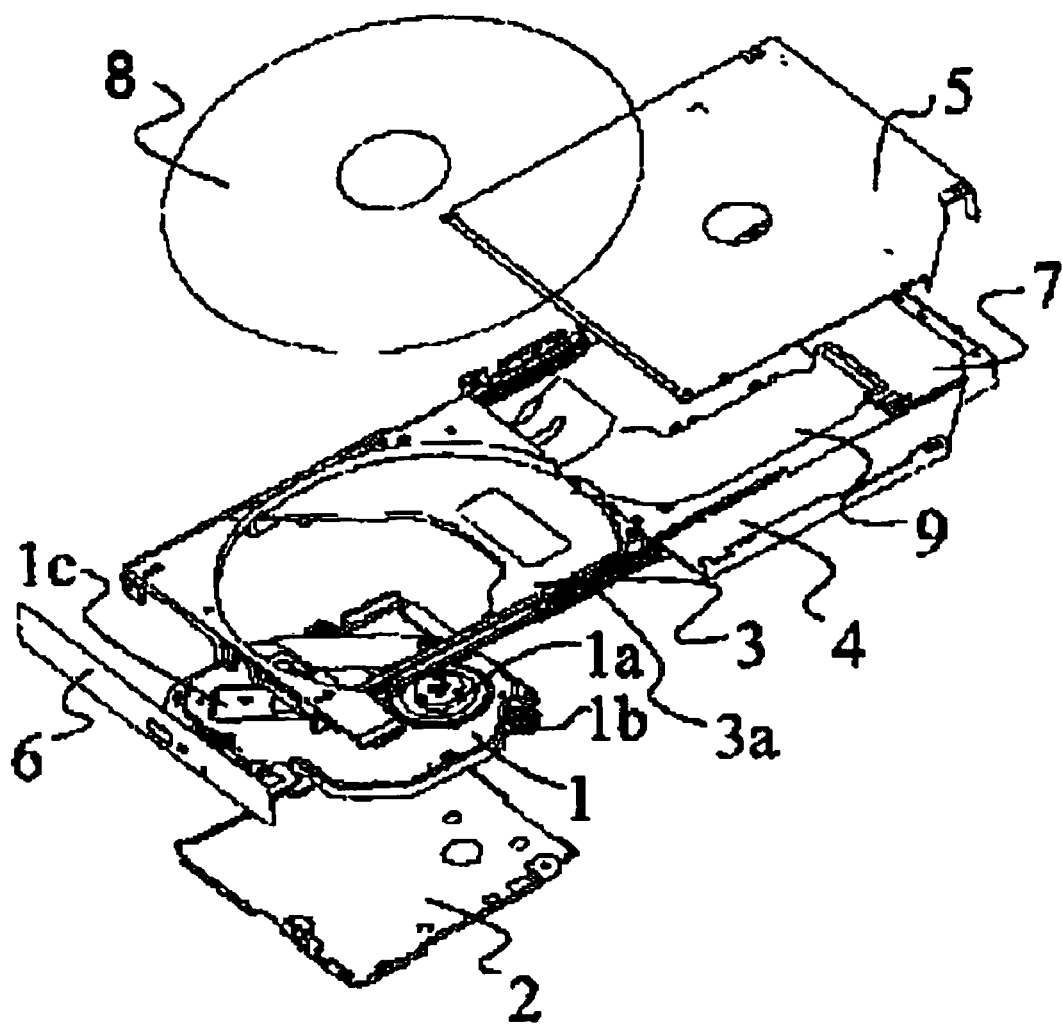
FIG. 5 is a perspective view showing the assembly of a conventional device.
Figure 6:
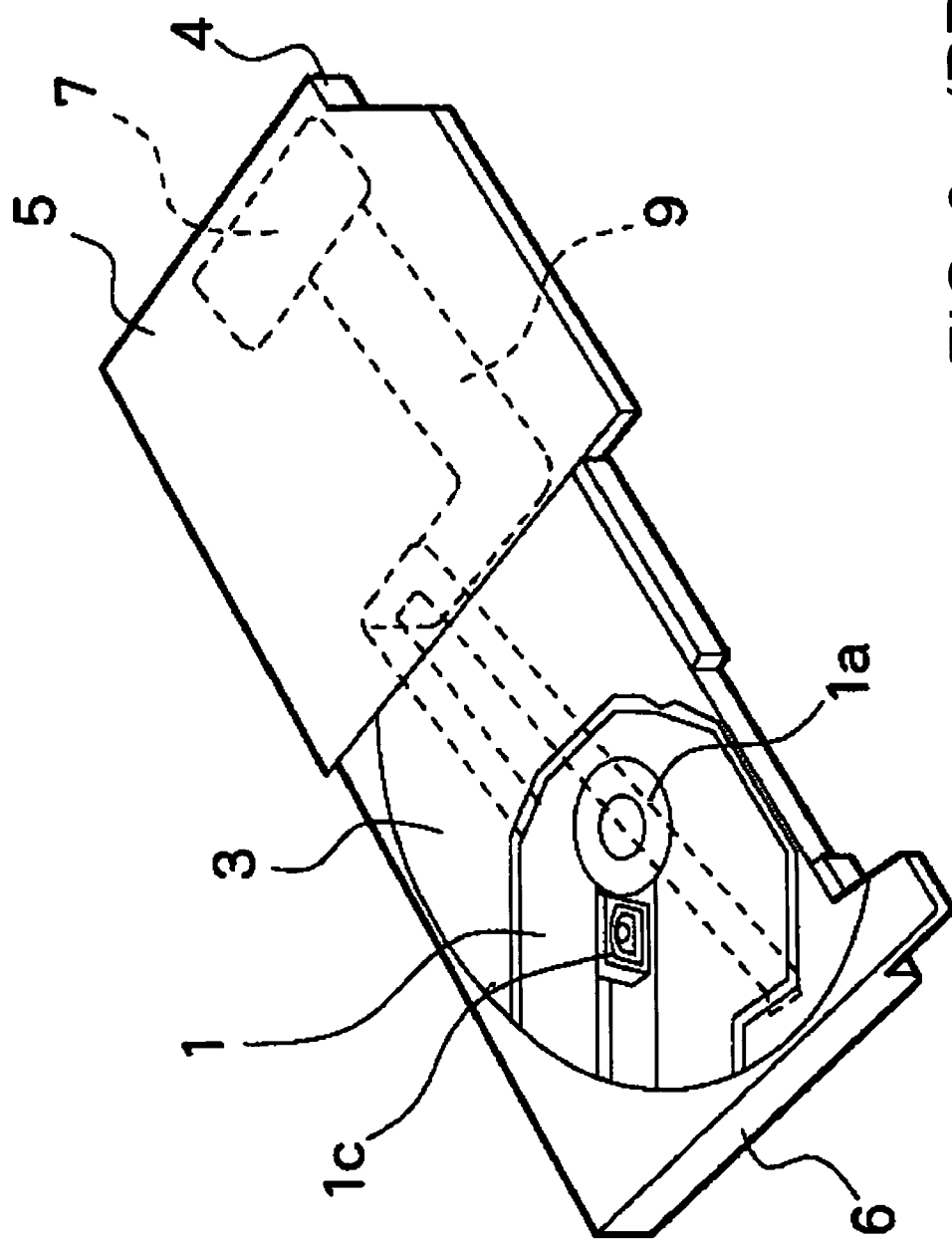
FIG. 6 is a perspective view showing the status that the conventional device is pulled out of the device body.

FIG. 4 is a block diagram showing another embodiment according to the present invention. The FPC 18 and the FPC 13 are integrated and the FPC 18 is connected between the spindle motor control substrate 10 and the head 1c and is connected between the medium substrate 12 and the head 1c. The actuator drive signal that comes form the driver IC is provided to the head 1c through only the FPC 18. With this structure, the restriction of the buffering effect resulting from the reaction force of the FPC 9 can be prevented, and the mixing of the noise towards the head detection signal can be restrained. Particularly, because the actuator drive signal is provided to the pickup head 1c without through the medium substrate 12, the noise restriction effect is relatively high.

In the above embodiments, the present invention can be applied to CD-ROM drives, CD-R/R drives and DVD drives, particularly can be applied to slim type drive carried on notebooks.

With the structure of the present invention, it is possible to provide a disk device with an improved S/N ratio.

While the present invention has been described with preferred embodiments, this description is not intended to limit our invention. Various modifications of the embodiment will be apparent to those skilled in the art. It is therefore contemplated that the appended claims will cover any such modifications or embodiments as fall within the true scope of the invention.

What is claimed is:

1. A disk device, comprising:

a body, having a main control substrate;

a tray, arranged in a manner that is moved in or apart from the body;

a spindle motor control substrate, installed below the tray via a buffer material;

a medium substrate, installed at a position different from the spindle motor control substrate below the tray;

a first flexible substrate, connected between the main control substrate and the spindle motor control substrate, and between the main control substrate and the medium substrate;

a second flexible substrate, connected between the spindle motor control substrate and a head transferring motor arranged below the tray; and a third flexible substrate, connected between the medium substrate and a pickup head arranged below the tray, wherein a driver that drives the spindle motor and the head transferring motor is arranged on the spindle motor control substrate, and the main control substrate and the head transferring motor are connected with each other through the first flexible substrate, the spindle motor control substrate and the second flexible substrate, and the main control substrate and the head are connected with each other through the first flexible substrate, the medium substrate and the third flexible substrate.

2. The device according to claim 1, further comprising:

a fourth flexible substrate, connecting the spindle motor control substrate and the medium substrate, wherein the driver drives the pickup head, and a drive signal of the pickup head that comes from the driver is supplied through the fourth flexible substrate and the medium substrate.

3. The device according to claim 1, wherein the driver drives the pickup head, and a drive signal of the pickup head that comes from the driver is supplied through the third flexible substrate.

* * * * *